United States Patent [19]

Crossley

[11] Patent Number: 4,916,445
[45] Date of Patent: Apr. 10, 1990

[54] OBSTRUCTION PROXIMITY INDICATION SYSTEM FOR AN AIRCRAFT

[76] Inventor: Simon M. Crossley, 3117 Teakwood La., Plano, Tex. 75075

[21] Appl. No.: 269,136

[22] Filed: Nov. 9, 1988

[51] Int. Cl.$^4$ .............................................. G08B 21/00
[52] U.S. Cl. .................... 340/946; 73/178 H; 244/17.11; 340/961; 362/62; 416/5
[58] Field of Search .............. 340/946, 945, 961, 981, 340/982; 73/178 H; 362/62, 63; 244/17.11, 17.13, 17.15, 135 A; 416/5, 61, 248; 356/1, 9

[56] References Cited

U.S. PATENT DOCUMENTS

| | | | |
|---|---|---|---|
| 1,648,463 | 11/1927 | Rohrbach | 340/981 |
| 2,938,192 | 5/1960 | Adler, Jr. | 340/981 |
| 3,455,272 | 7/1969 | Zeller . | |
| 3,710,311 | 1/1973 | Avital | 362/62 |
| 3,765,770 | 10/1973 | McConnell et al. . | |
| 3,803,614 | 4/1974 | Reid . | |
| 4,066,890 | 1/1978 | Hamilton et al. . | |
| 4,115,841 | 9/1978 | Alexander | 362/62 |
| 4,233,652 | 11/1980 | Oswald | 340/981 |
| 4,465,367 | 8/1984 | Sabatier | 73/455 |
| 4,528,564 | 7/1985 | Trampnau | 340/946 |
| 4,531,408 | 7/1985 | Chadwick et al. | 73/455 |
| 4,633,376 | 12/1986 | Newman | 362/62 |
| 4,695,013 | 9/1987 | Trampnau | 340/946 |

FOREIGN PATENT DOCUMENTS 1446960 6/1966 France .................................. 416/5

OTHER PUBLICATIONS

"Aircraft Illumination", AIEE paper, W. W. Davies, 6-1-44.

Primary Examiner—Joseph A. Orsino
Assistant Examiner—Brent A. Swarthout
Attorney, Agent, or Firm—Glen M. Burdick

[57] ABSTRACT

Visually observable safe limits for the proximity of an aircraft, such as a helicopter, to obstructions are provided by pairs of lights which provide collimated beams intersecting at limit points located radially outwardly of the arc of the helicopter rotor blades so that light scattered from the intersecting beams at the limit points provides the helicopter pilot with visual references of the rotor arc. Each light of each pair has a concave reflector and a lamp at the focal point of the reflector to provide the collimated beams and transparent plastic shields over the open ends of the reflectors have concavities in central portions to provide diverging beams that illuminate the obstructions.

11 Claims, 1 Drawing Sheet

OBSTRUCTION PROXIMITY INDICATION SYSTEM FOR AN AIRCRAFT

BACKGROUND OF THE INVENTION

1. Field of the Invention

The present invention relates generally to systems for providing indications of hazardous conditions to aircraft and, more particularly but not by way of limitation, to systems that provide indications of the proximity of helicopters to obstructions.

2. Brief Description of the Prior Art.

In recent years, helicopters have increasingly come to be used in circumstances in which a helicopter is flown near an obstruction under conditions that provide the pilot with only limited visibility. For example, hovering helicopters have been used to rescue people from roofs of burning buildings so that visibility can be limited by smoke while the helicopter is flown near air conditioning and elevator equipment that is often located on a rooftop. Similarly, and again in rescue situations, a helicopter might be flown near buildings, cliffs and the like under inclement weather conditions. Additionally, dust can be thrown up by the downdraft of a helicopter's rotors while the helicopter is maneuvering near objects on the ground. In these circumstances, a severe hazard exists that the helicopter rotors, which, because of their rotation, are difficult to see, will contact the obstruction to cause the helicopter to crash. Nor are such hazards limited to helicopters. Vertical take off and lift aircraft experience similar hazards when operated from, for example, the deck of an aircraft carrier. In this case, the wings of the aircraft may contact the carrier's island to similarly result in a crash.

Unfortunately, little has been done to provide a helicopter pilot with a system that will enable him to accurately gauge the location of the rotors with respect to obstructions near which he might be maneuvering and, especially, near which he might be maneuvering under conditions of limited visibility. While it is known to mount lights in the tips of rotors, as disclosed in U.S. Pat. No. 4,066,890, so that the pilot can see the arc along which the rotor tips are moving under conditions of good visibility, no system has heretofore been developed which will enable the pilot of a helicopter not only to accurately judge the location of the rotor arc under limited visibility conditions but also provide him with a clear indication of his freedom to maneuver while he is flying near obstructions.

SUMMARY OF THE INVENTION

The present invention exploits the scattering of light by a cause of limited visibility, smoke, dust, rain or the like, to provide the pilot of a helicopter with an obstruction proximity indication system that indicates to the pilot not only an absolute minimum safe flying distance from the obstruction but, additionally, the distance between the minimum and nearby obstructions. To this end, the system of the present invention is comprised of at least one first light source that provides a collimated beam extending past the rotor arc and a second light source that provides a collimated beam that similarly extends past the rotor arc to intersect the light beam from the first light source at a proximity limit location that can be selected to be on a level with the rotors and displaced a selected distance radially therefrom. Since the beams are collimated, little loss of intensity will occur between the light sources and the proximity limit location so that light scattered from the cause of limited visibility will mark both the beams and their intersection to provide the pilot with the location of the limit locations at a glance from the aircraft. Additionally, the collimation of the beams serves to limit the volume of space in which the beams intersect to, consequently, restrict the sizes of the proximity limit locations and thereby enhance the definition of the aircraft location relative to obstructions. Moreover, since both beams will continue radially outwardly from the aircraft to impinge on any nearby obstruction, the pilot is further provided with the distance between the proximity limit locations and the obstructions so that he is in a position to gauge the rapidity with which a maneuver on the part of his aircraft may be safely undertaken.

An important object of the present invention is to provide the pilot of an aircraft with an indication of the proximity of the aircraft to obstructions near which he may be flying.

Another object of the invention is to provide a hazard warning to the pilot of an aircraft that will enable the pilot to accurately judge the freedom with which he may safely maneuver his aircraft about obstructions near which he is flying.

Still another object of the invention is to provide a system that will enable a helicopter pilot to safely maneuver his aircraft near obstructions under conditions of limited visibility.

A further object of the invention is to provide an obstruction proximity indicator for helicopter pilots that is reliable, economical to manufacture and economical to install.

Other objects, features and advantages of the present invention will become apparent from the following detailed description when read in conjunction with the drawings and appended claims.

DESCRIPTION OF THE PREFERRED EMBODIMENT

Figure 1:
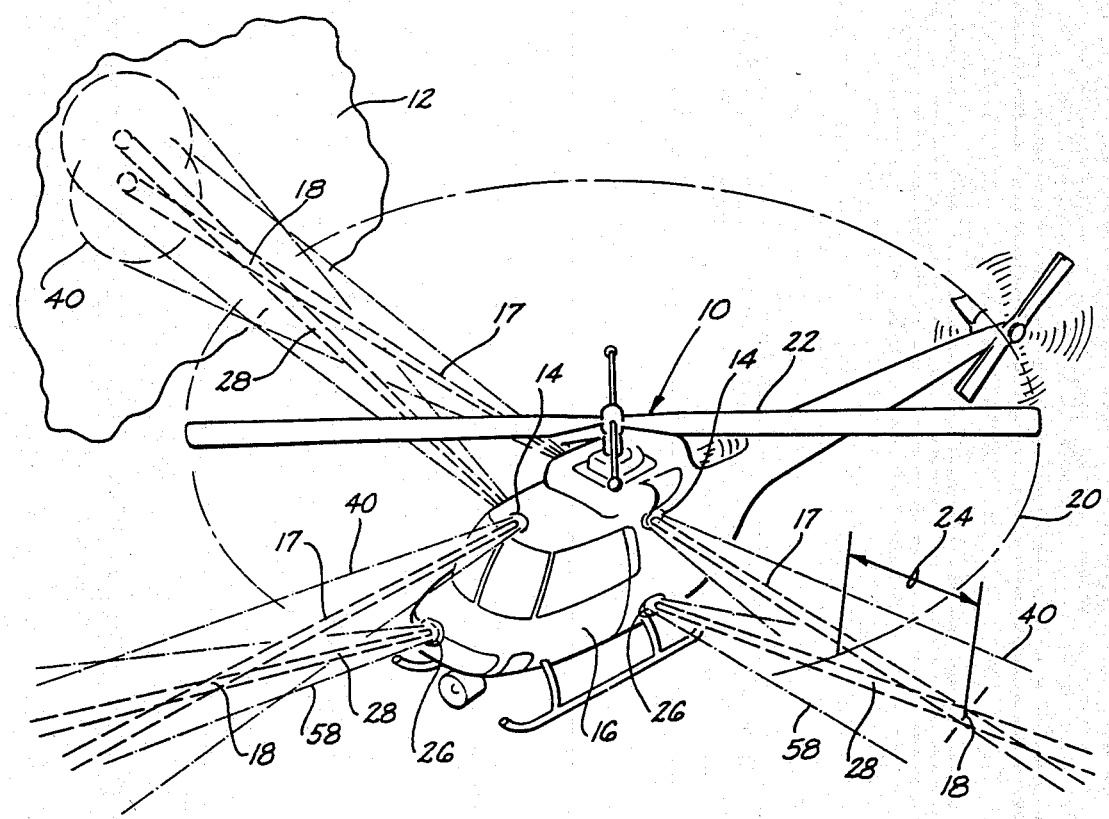
FIG. 1 is an isometric view of an aircraft; specifically, a helicopter equipped with a proximity indication system constructed in accordance with the present invention.

Referring now to the drawings in general, and more particularly to FIG. 1, shown therein and designated by the general reference numeral 10 is an aircraft equipped with an obstruction proximity indication system (not generally designated in the drawings) constructed in accordance with the present invention. For purposes of this disclosure, the aircraft 10 has been illustrated as a helicopter but no limitation as to particular aircraft type is intended by such illustration. Rather, the invention can be used with any type of aircraft; for example, a vertical takeoff and land aircraft, that can be expected to be operated near stationary objects, as indicated at 12 in FIG. 1, in carrying out normal functions of the aircraft.

In general, the obstruction proximity indication system is comprised of a plurality of first light sources 14 that are mounted on a fuselage 16 of the aircraft 10 to project collimated beams of light 17, as will be discussed below, outwardly of the aircraft 10 to pass through selected proximity limit locations 18 that are disposed exteriorly to all portions of the aircraft. In particular, in the case in which the aircraft 10 is a helicopter, the first light sources 14 are preferably mounted on upper portions of the fuselage 16 and angled slightly upwardly to place the proximity limit locations on a level with a path of travel 20 of a helicopter rotor 22 and a selected distance 24 radially outwardly of the path 20 to indicate, as will be discussed below, a minimum clearance between the rotors 22 and obstructions, such as the obstruction 12, at which the aircraft 10 can be safely operated. A typical value for the distance 24 that will provide a suitable safety factor against drift of the aircraft and movement caused by winds is approximately five feet.

In addition to the first light sources 14, the obstruction proximity indication system is further comprised of a plurality of second light sources 26, equal in number to the first light sources 14, that are mounted on lower portions of the fuselage 16 and aimed thereon to project collimated beams of light 28 through the proximity limit locations 18. As indicated in FIG. 1, each second light source 26 is paired with a selected first light source 14, which is located directly above the second light source 26, so that two collimated light beams, one from upper portions of the fuselage 16 and one from lower portions of the fuselage 16, intersect at each proximity limit location 18.

Figure 2:
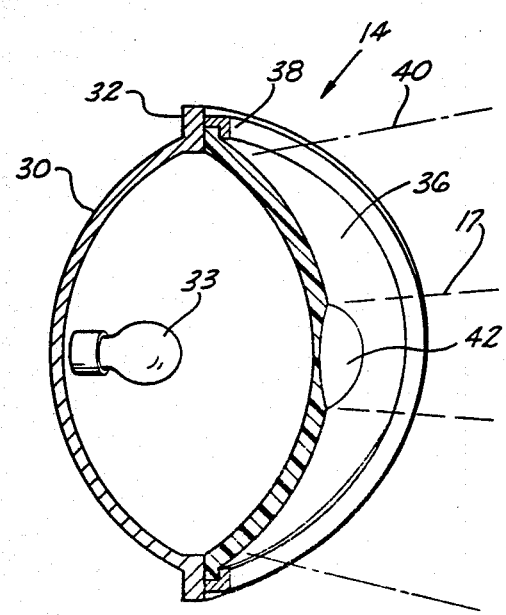
FIG. 2 is an isometric view, in partial cross-section, of a first light source used in the proximity indication system.

The manner in which the first light sources 14 are constructed to provide the collimated beams 17 has been illustrated in FIG. 2 to which attention is now invited. As shown therein, each first light source 14 is comprised of a concave reflector 30 having a flange 32 by means of which the light source 14 can be secured within a well in the aircraft fuselage 16 or a suitable housing mounted on the fuselage 16 in a conventional manner. Within the reflector 30, and at the focal point thereof, the light source 14 is further comprised of a conventionally mounted lamp 33 so that light emitted by the lamp 33 and reflected from the reflector 30 emerges as a collimated beam as indicated at 17 in FIG. 2. A hemispherical shield 36, constructed of a plastic material, is mounted over the open end of the reflector 30 and held in place by a guard ring 38 that is secured to the flange 32 in any convenient manner.

In the preferred form of the invention, the first light sources 14 are constructed to provide, in addition to the collimated beams 17, diverging beams of light 40, indicated in dot-dash lines in FIGS. 1 and 2, that are coaxial to the collimated beams 17. To this end, a concavity 42 is formed in central portions of the shield 36 to provide a negative lens that is aligned with the axis of the collimated beam 17. As shown in FIG. 2, the concavity 42 has a small diameter compared to the diameter of the reflector 30 so that, in combination with the divergence of the beam 40, the intensity of the beam 40 in the vicinity of the proximity limit locations will be considerably lower than the intensity of the collimated beams 17 and 28 of the first and second light sources 14 and 26 so that the beams 40 will not interfere with the visibility of light scattered from the proximity limit locations by; for example, dust thrown up by the downwash of the rotor 22.

As shown in FIG. 1, the divergent beam 40 illuminates a large area of the obstruction 12 to permit the pilot of the aircraft to accurately determine the separation between the obstruction 12 and the safe limit of approach defined by the proximity limit location so that he can adjust the degree and rate of maneuvers he performs to insure that the rotor 22 always remains separated from the obstruction 12.

Figure 3:
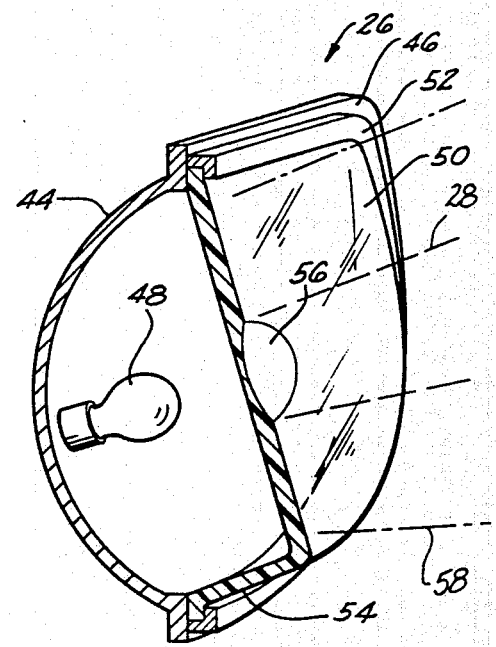
FIG. 3 is an isometric view, in partial cross-section, of a second light source used in the proximity indication system.

The second light sources 26 (see FIG. 3) are constructed similarly to the first light sources 14. As shown therein, each second light source 28 comprises a concave reflector 44, having a mounting flange 46 used to mount the reflector 44 on the aircraft 10, a lamp 48 at the focus of the reflector 44, and a transparent shield 50. The transparent shield 50 extends over the open end of the reflector 44 and is held in place by a guard ring 52. In the light source 26, the reflector 44 is positioned to have an axis of cylindrical symmetry that is directed toward the proximity limit location corresponded to be defined by the second light source 26 and its associated first light source 14 so that the reflector 44 directs the collimated light beam 28 through the shield 50 toward such proximity limit location.

In the second light source 26, the shield 50 has the form of a plate with an axially extending flange cut at an angle to the plate and, like the shield 36, is preferably constructed of a plastic material. As in the case of the shield 36 of the first light source 14, the shield 50 is provided with a small central concavity 56 that provides a low intensity diverging beam 58 (shown in dot-dash lines in FIG. 1) coaxial to the collimated beam 28.

As will be clear from the above description of the first and second light sources 14 and 26, the collimation of the light beams 17 and 28 will limit losses in intensity for such beams from the first and second light sources 14 and 26 to the proximity limit locations to enhance the visibility of light scattered from such locations. Such visibility can be further enhanced by selecting high intensity halogen lamps for the lamps 33 and 48 and the geometric limits of the proximity limit locations are, in the preferred embodiment of the invention, distinguished from the collimated beams 17 and 28 by projecting the beams 17 and 28 in different colors; that is, the use of different colors for the beams 17 and 28 will give rise to qualitative differences across the boundaries between each beam 17 and 28 and the sum of the two beams. Thus, the pilot of the aircraft will be able to determine the positions of the proximity limit locations 18 by merely glancing through the windshields of the aircraft. The difference in colors can be conveniently effected by using lamps 33 and 48 of different colors or by tinting the shields 36 and 50.

Operation of the Preferred Embodiment

In use, the obstruction proximity indication system is mounted on an aircraft such as the helicopter 10 shown in FIG. 1 and discussed above. The first and second light sources 14 and 26 of the obstruction proximity indication system are connected, via suitable switches, to the helicopter electrical system, preferably in a circuit separate from other lighting systems of the aircraft to prevent mishaps to one light system from affecting the other system. Thus, should either the conventional lighting system of the aircraft or the obstruction proximity indication system malfunction during an operation in which the aircraft is operating near a stationary object, the other system can, in many cases, be used to gauge the position of the object sufficiently to remove the aircraft from the scene. The separate wiring of the obstruction proximity indication system provides an additional safety factor for the pilot of the aircraft.

When the aircraft is called upon to perform some operation near a stationary object, for example the rescue of persons from a burning building, the first and second light sources 14 and 26 are activated as the aircraft nears the stationary object so that the pilot can observe the minimum distance that he can approach the object. At times when the pilot is a large distance from the object, he will observe a large distance between the proximity limit locations and the object and can, accordingly, engage in maneuvers that will rapidly bring him to a desired location with respect to stationary objects with which the operation is concerned. On the other hand, should the positioning of the aircraft bring him near a stationary object, the pilot can readily gauge the distance between the object and the proximity limit locations and utilize appropriately small corrections to his position that will eliminate any possibility of inadvertently making a large shift in position that might bring a portion of the aircraft, such as the rotors 22 of the helicopter 10, into contact with the stationary object 12.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A system for providing a visual indication of a safe limit of proximity between an aircraft and a stationary object, comprising:
   a first light source mounted on the fuselage of the aircraft and comprising collimation means for providing a collimated beam of light of a first selected color extending outwardly from the aircraft; and
   a second light source mounted on the fuselage of the aircraft and comprising collimation means for providing a collimated beam of light of a second selected color extending outwardly from the aircraft to intersect the collimated beam provided by the first light source at a selected proximity limit location outside the volume of space containing all portion of the aircraft.

2. The system of claim 1 comprising a plurality of first light sources and an equal number of second light sources paired with the first light sources to provide a plurality of pairs of collimated light beams intersecting at a plurality of selected proximity limit locations.

3. The system of claim 2 wherein said first color differs from said second color.

4. The system of claim 2 wherein the collimation means of each of the first light sources and each of the second light sources comprises:
   a concave reflector; and
   a lamp placed at the focal point of the reflector; and
wherein each of the first and second light sources further comprises a transparent reflector shield extending over the open end of the reflector, each reflector shield having a concavity formed in a central portion of the surface thereof between the lamp and the proximity limit location selected for the light source to provide a diverging beam of light substantially centered on the proximity limit location selected for the light source.

5. The system of claim 3 wherein the aircraft is a helicopter and wherein the selected proximity limit locations are on a level with and radially displaced from the path of travel of the rotor blades of the helicopter.

6. The system of claim 1 wherein the collimation means of each of the first light sources and each of the second light sources comprises:
   a concave reflector; and
   a lamp placed at the focal point of the reflector; and
wherein each of the first and second light sources further comprises a transparent reflector shield extending over the open end of the reflector, each reflector shield having a concavity formed in a central portion of the surface thereof between the lamp and the proximity limit location selected for the light source to provide a diverging beam of light substantially centered on the proximity limit location selected for the light source.

7. The system of claim 6 wherein the aircraft is a helicopter and wherein the selected proximity limit location is on a level with and radially displaced from the path of travel of the rotor blades of the helicopter.

8. The system of claim 1 wherein the aircraft is a helicopter and wherein the selected proximity limit location is on a level with and radially displaced from the path of travel of the rotors of the helicopter.

9. The system of claim 8 wherein said first color differs from said second color.

10. The system of claim 1 wherein each of the first and second light sources further comprises means for providing an additional beam of light diverging from the light source along the collimated beam of light from the light source.

11. The apparatus of claim 10 wherein said first color differs from said second color.

* * * * *